(12) United States Patent
Lai

(10) Patent No.: US 6,842,201 B2
(45) Date of Patent: Jan. 11, 2005

(54) ACTIVE MATRIX SUBSTRATE FOR A LIQUID CRYSTAL DISPLAY AND METHOD OF FORMING THE SAME

(75) Inventor: Han-Chung Lai, Jungli (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/436,756

(22) Filed: May 12, 2003

(65) Prior Publication Data

US 2003/0210356 A1 Nov. 13, 2003

(30) Foreign Application Priority Data

May 13, 2002 (TW) ........................ 91109929 A

(51) Int. Cl.⁷ ............... G02F 1/1336; G02F 1/133
(52) U.S. Cl. ................... 349/43; 349/138; 257/59
(58) Field of Search ............... 349/42–43, 138, 349/139, 187; 257/59, 72

(56) References Cited

U.S. PATENT DOCUMENTS

| | | | |
|---|---|---|---|
| 5,478,766 A | 12/1995 | Park et al. ............ 437/40 |
| 5,641,974 A | 6/1997 | den Boer et al. ........... 257/59 |
| 5,780,871 A | 7/1998 | den Boer et al. ........... 257/59 |
| 5,955,744 A | 9/1999 | Gu et al. .................. 257/59 |
| 6,294,796 B1 | 9/2001 | Mano et al. .............. 257/59 |
| 6,356,319 B1 * | 3/2002 | Park et al. ............... 349/43 |
| 6,559,906 B1 * | 5/2003 | Kawachi et al. .......... 349/47 |
| 6,570,631 B2 * | 5/2003 | Ko ........................... 349/43 |
| 6,654,076 B2 * | 11/2003 | Ha et al. .................. 349/43 |
| 6,717,631 B2 * | 4/2004 | Choi ........................ 349/43 |

* cited by examiner

Primary Examiner—Toan Ton
(74) Attorney, Agent, or Firm—Ladas & Parry LLP

(57) ABSTRACT

An active matrix substrate for a liquid crystal display and method of forming the same. To form the active matrix substrate five masks are needed. The first mask forms data lines on the transparent substrate. After forming a low k dielectric layer, the second mask forms contact windows therein. The third mask patterns pixel electrodes and conducting lines connecting sources and the data lines. The fourth mask patterns a metal layer/an insulating layer/a semiconductor layer/n-doped layer to form gate lines and TFTs on the low k dielectric layer. After depositing a passivating layer the fifth mask defines the passivating layer.

13 Claims, 5 Drawing Sheets

ACTIVE MATRIX SUBSTRATE FOR A LIQUID CRYSTAL DISPLAY AND METHOD OF FORMING THE SAME

BACKGROUND OF THE INVENTION

1. Field of the Invention

The present invention relates in general to an active matrix substrate for a liquid crystal display (LCD) and method of forming the same. In particular, the present invention relates to a liquid crystal display having a high pixel aperture ratio (pixel opening size) and method of forming the same.

2. Description of the Related Art

Generally, LCDs have an upper and a lower substrate with electrodes thereon. These substrates are sealed with adhesive materials, and a liquid crystal material is sealed between these two substrates. Before the liquid crystal is injected between the two substrates, spacers are sprayed between the substrates in order to hold a constant distance therebetween. Conventionally, many TFTs are formed above the lower substrate as switching devices. Each TFT has a gate electrode connected to a scanning line, a drain electrode connected with a signal line, and a source electrode connected to a pixel electrode. The lower substrate is also called an active matrix substrate. The upper substrate includes a color filter and a common electrode.

The higher the pixel aperture ratio of a LCD, the higher the display transmission. Thus, by increasing the pixel aperture ratio of a LCD, transmission may be increased using the same backlight power, or alternatively, the backlight power consumption may be reduced while maintaining the same display transmission.

In order to enhance the pixel aperture ratio, a thicker insulating layer is formed over source and drain electrodes before forming pixel electrodes, thus, the pixel electrodes are formed over the insulating layer so as to overlap portions of the address lines, as disclosed in U.S. Pat. Nos. 5,955,744, 5,780,871, 5,641,974. Thus, the capacitance between pixel electrodes and underlying conducting material can be reduced, and an effective display area, i.e. the area of the pixel electrode, can be enlarged.

SUMMARY OF THE INVENTION

It is an object of the present invention to provide a method of forming an active matrix substrate for a liquid crystal display with a high pixel aperture ratio and method of forming the same.

According to one aspect of the invention, an active matrix substrate for a liquid crystal display is provided. A transparent substrate having a plurality of active device regions and a plurality of pixel regions is provided. A plurality of data lines is disposed on the transparent substrate. The data lines are parallel to a first direction and have many protruding portions covering the active device regions. A low k dielectric layer covers the data lines and the transparent substrate. The low k dielectric layer has many contact windows contacting the corresponding surfaces of the protruding portions of data lines. A plurality of gate lines are disposed on the low k dielectric layer. The gate lines are perpendicular to the first direction and have many protruding portions covering the active device regions. The data lines and the gate lines define a plurality of regions including the active device regions and the pixel regions. A gate-insulating layer is disposed under the gate lines. The gate-insulating layer contacts the gate lines and has the same pattern as the gate lines. A semiconductor layer is disposed between the gate-insulating layer and the low k dielectric layer. The semiconductor has the same pattern as the gate lines. A plurality of sources and drains are disposed between the semiconductor layer and the low k dielectric layer, wherein a channel exists between each source and its corresponding drain. A plurality of pixel electrodes are disposed on the low k dielectric layer at the pixel regions and contacting the drains. A plurality of conducting lines connect the data lines and the sources through the contact windows. A passivating layer is disposed on the gate lines and the conducting lines.

According to another aspect of the invention, an active matrix substrate for a liquid crystal display can be formed by following steps. A transparent substrate having a plurality of active device regions and a plurality of pixel regions is provided. A plurality of data lines are formed on the transparent substrate, wherein the data lines are parallel to a first direction and have a plurality of protruding portions covering the active device regions. A low k dielectric layer is formed on the data lines and the transparent substrate. A plurality of contact windows are formed in the low k dielectric layer to expose the corresponding surfaces of the protruding portions of data lines. A plurality of pixel electrodes are formed on the low k dielectric layer and a plurality of conducting lines are formed to contact the data lines through the contact windows at the same time. An n-doped layer is formed on the pixel electrodes and the conducting lines. A semiconductor layer is formed on the n-doped layer and the low k dielectric layer. An insulating layer is formed on the semiconductor layer. A metal layer is formed on the insulating layer. The n-doped layer, the semiconductor layer, the insulating layer and the metal layer are defined. The n-doped layer then becomes a plurality of sources and drains, the insulating layer becomes a gate-insulating layer, and the metal layer becomes a plurality of gate lines perpendicular to a first direction. A passivating layer is formed on the gate lines and the conducting lines.

As for forming the active matrix substrate for a liquid crystal display in accordance with the present invention, five masks are needed. The first mask forms the data lines on the transparent substrate. After forming the low k dielectric layer, the second mask forms the contact windows therein. The third mask patterns the pixel electrodes and conducting lines connecting sources and the data lines. The fourth mask patterns the metal layer/the insulating layer/the semiconductor layer/the-doped layer to form the gate lines and TFTs on the low k dielectric layer. After depositing the passivating layer the fifth mask defines the passivating layer.

BRIEF DESCRIPTION OF THE DRAWINGS

The present invention will become more fully understood from the detailed description given hereinbelow and the accompanying drawings, given by way of illustration only and thus not intended to be limitative of the present invention.

FIGS. 2A–2E are cross sections showing the manufacturing steps in fabricating an active matrix substrate for a liquid crystal display in accordance with the present invention, wherein FIGS. 2A–2D are cross sections taken along line II—II of FIGS. 1A–1D respectively.

DETAILED DESCRIPTION OF THE INVENTION

Figure 1A:
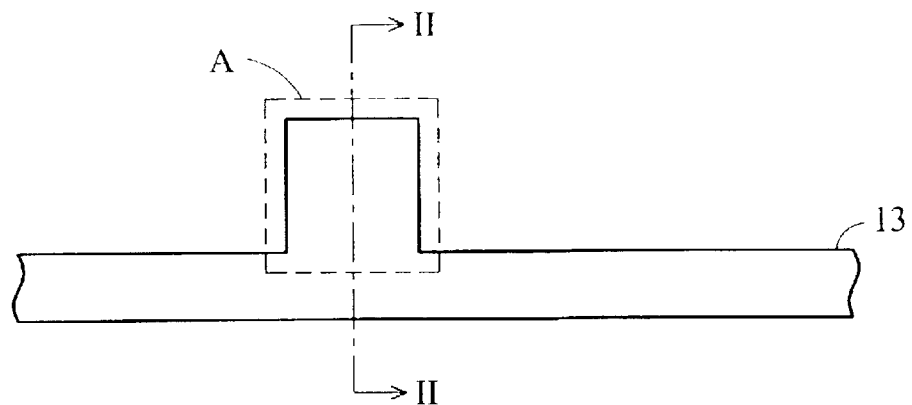
FIGS. 1A–1D are a series of layouts of the active matrix substrate showing the manufacturing steps in fabricating an active matrix substrate for a liquid crystal display in accordance with the present invention.
Figure 1B:
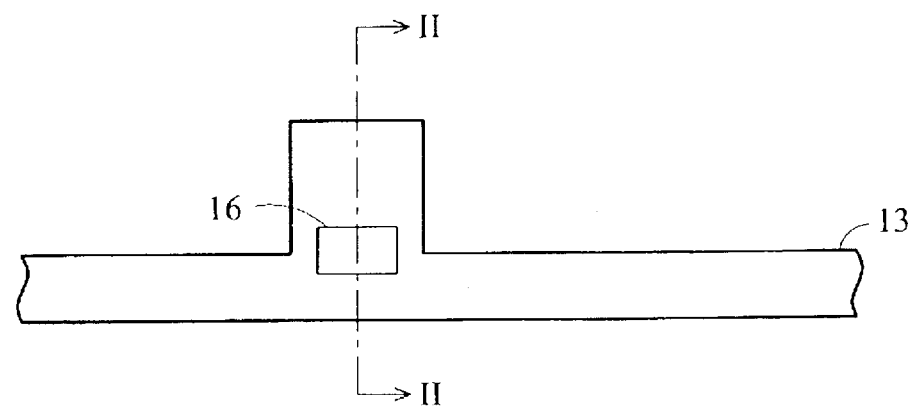
Figure 1C:
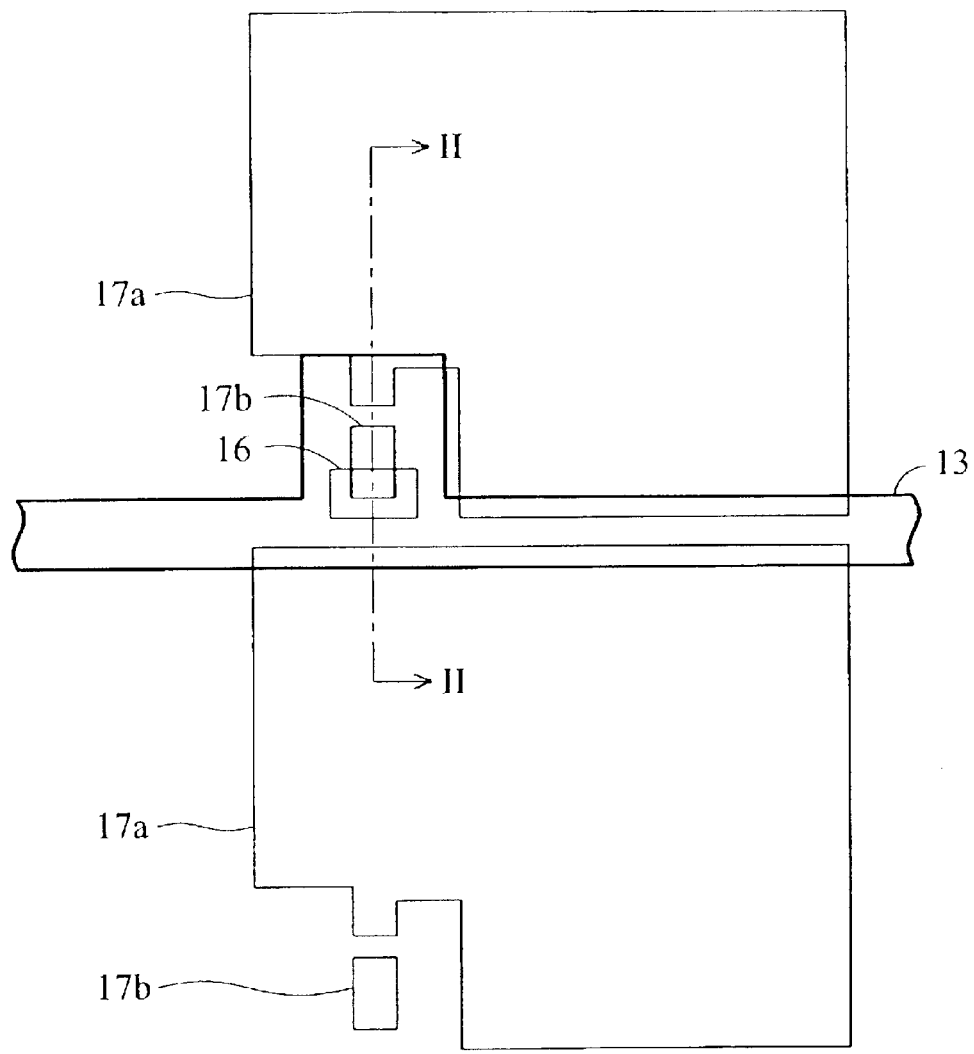
Figure 1D:
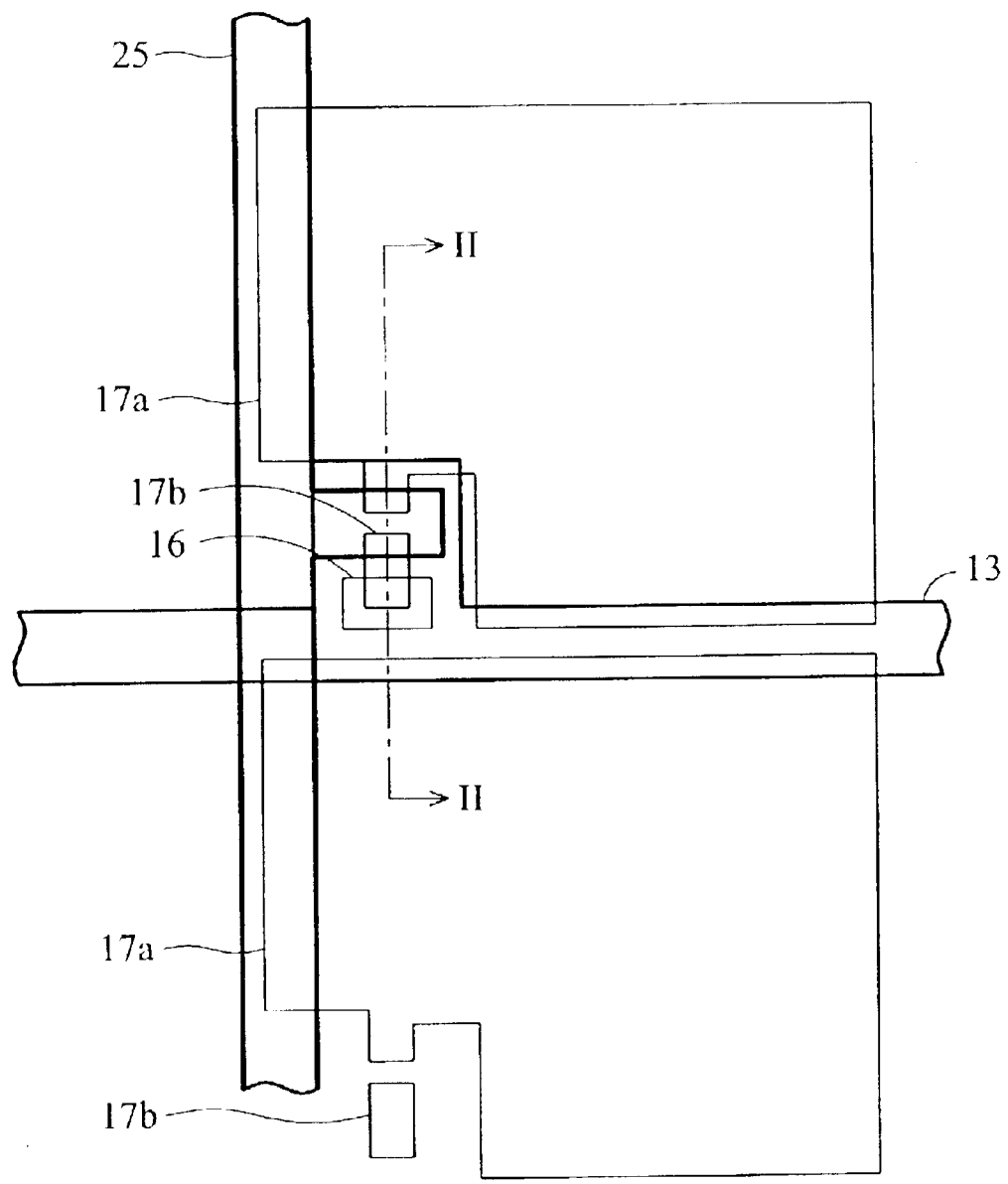
Figure 2A:
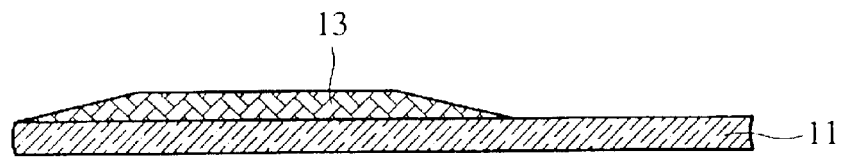
Figure 2B:
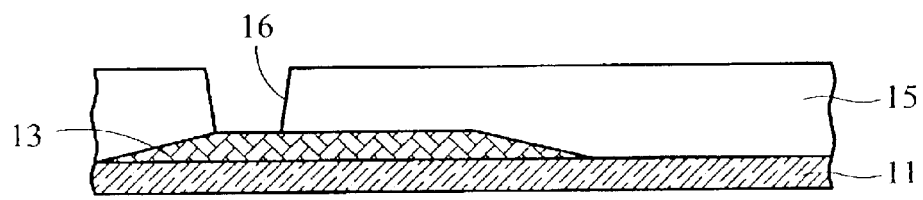
Figure 2C:
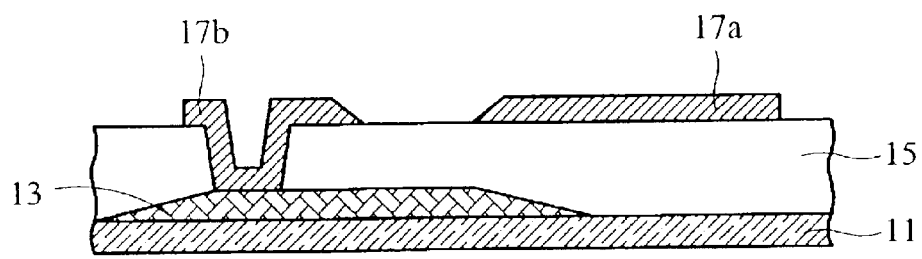
Figure 2D:
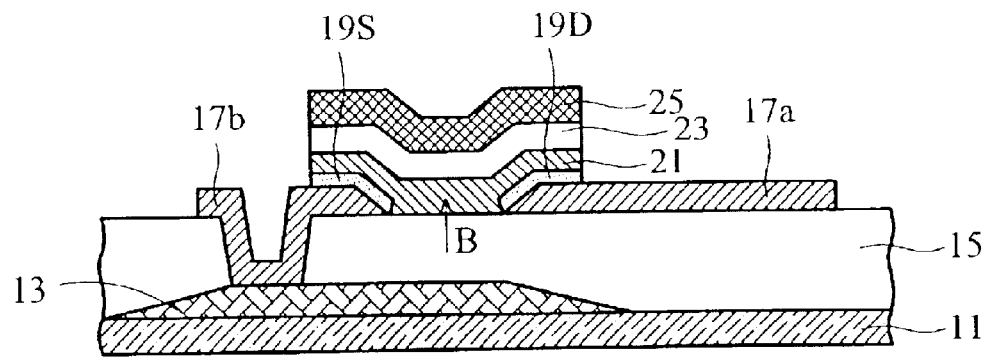
Figure 2E:
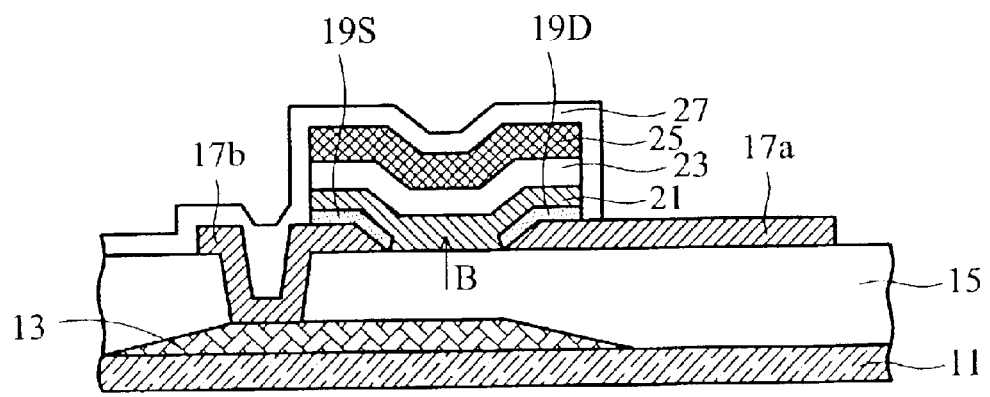

An active matrix substrate having a high pixel aperture ratio is provided, as shown in FIGS. 1D and 2E.

Data lines 13 parallel to a first direction are disposed on a transparent substrate 11, and the data lines 13 have protruding portions covering active device regions A (as shown in FIG. 1A). A low k dielectric layer 15 covers the data lines 13 and the transparent substrate 11. Contact windows 16 are formed in the low k dielectric layer 15 and corresponding to surfaces of the protruding portions of data lines 13. Gate lines 25 perpendicular to the first direction are disposed on the low k dielectric layer 15, and the gate lines 25 have protruding portions disposed on the active device regions A. Each region defined by the data lines and the gate lines is divided into the active device region A and a pixel region, and each active device region A is located at one corner of each pixel region. A gate-insulating layer 23 is disposed under the gate lines 25 and contacts the gate lines 23. A semiconductor layer 21 is disposed between the gate-insulating layer 23 and the low k dielectric layer 15. A source 19S and a drain 19D are disposed between the semiconductor layer 21 and the low k dielectric layer 15 at each active device region A, and a channel B exists between the source 19S and the drain 19D in the semiconductor layer 21. The semiconductor layer 21, the gate insulating layer 23 and the gate lines 25 have the same pattern. Pixel electrodes 17a are disposed on the low k dielectric layer 15 at the pixel regions and the pixel electrodes 17a contact the drains 19D. Conducting lines 17b connect the data lines 13 and the sources 19S through the contact windows 16. A passivating layer 27 is disposed on the gate lines 25 and the conducting lines 17.

In summary, TFTs, the pixel electrodes 17a are disposed on the low k dielectric layer 15.

The following is an example of fabricating an active matrix substrate for a liquid crystal display.

FIGS. 2A–2E are cross sections showing the manufacturing steps in fabricating an active matrix substrate for a liquid crystal display in accordance with the present invention. FIGS. 1A–1D are a series of layouts of the active matrix substrate of FIGS. 2A–2D respectively.

Referring to FIGS. 1A and 2A, a transparent substrate 11 is provided. A metal layer, such as Al or Al alloy, is formed on the transparent substrate 11. After defining the metal layer using lithography and etching, source lines 13, i.e. data lines, are formed. The data lines 13 have protruding portions covering active device regions A and function as a black matrix (BM) Each active device region A is located at a corner of each pixel region.

Referring to FIGS. 1B and 2B, a low k dielectric layer 15 is formed on the data lines 13 and the transparent substrate 11. The low k dielectric layer 15 has a dielectric constant (k) less than 5, high transparency, acid-resistant and heat-resistant. Because the low k dielectric layer 15 can reduce the capacitance between data lines and the pixel electrodes to be formed, the pixel electrodes can be formed over the insulating layer to overlap portions of the data lines to increase the pixel aperture ratio. The low k dielectric layer 15 can be photosensitive material or non-photosensitive material, such as benzocyclobutene (BCB). The thickness of the low k dielectric layer 15 is about 1–5 μm.

Contact windows 16 are then formed in the low k dielectric layer 15.

Referring to FIGS. 1C and 2C, a transparent conducting layer, such as indium tin oxide (ITO) layer, is formed on the low k dielectric layer 15 and patterned to form pixel electrodes 17a and conducting lines 17b, and the conducting lines 17b connect the data lines 13 through the contact windows 16.

Referring to FIGS. 1D and 2D, an n-doped layer is formed on the pixel electrodes 17a and conducting lines 17b. A semiconductor layer, an insulating layer and a metal layer are sequentially formed on the n-doped layer. The semiconductor layer can be amorphous silicon, the insulating layer can be silicon nitride, and the metal layer can be Cr or Cr alloy. The metal layer/the insulating layer/the semiconductor layer/the n-doped layer are etched by one photolithography and etching process to form gate lines 25, a gate-insulating layer 23, a patterned semiconductor layer 21, sources 19S and drains 19D. The gate lines 25 have protruding portions at active device regions A, and the protruding portions of the gate lines 25 function as gates for thin film transistors (TFTs). A channel B exists between each source 19S and its corresponding drain 19D. Thus, the sources 19S, the drains 19D, the protruding portions of the gate lines 25, the gate-insulating layer 23 and the semiconductor layer 21 constitute TFTs.

The above-mentioned n-doped layer can be formed by plasma treating the surface of the ITO layer with $PH_3$.

Alternatively, the n-doped layer can be formed by deposition on the above-mentioned transparent conducting layer. The n-doped layer is then etched when defining the transparent conducting layer to the pixel electrodes 17a and the conducting lines 17b. Thus, the etched n-doped layer has the same pattern as the pixel electrodes 17a and the conducting lines 17b.

Referring to FIG. 2E, a passivating layer 27, such as a silicon nitride layer, is formed on the gate lines 25 and the conducting lines 17b.

After forming the passivating layer 27 the active matrix substrate is obtained. The following processes of fabricating upper substrate and filling liquid crystal therebetween follow.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An active matrix substrate for a liquid crystal display, comprising:
    a transparent substrate having a plurality of active device regions and a plurality of pixel regions;
    a plurality of data lines disposed on the transparent substrate, parallel to a first direction and having a plurality of protruding portions covering the active device regions;
    a low k dielectric layer covering the data lines and the transparent substrate, the low k dielectric layer having a plurality of contact windows contacting the corresponding surfaces of the protruding portions of data lines;
    a plurality of gate lines disposed on the low k dielectric layer, perpendicular to the first direction and having a plurality of protruding portions covering the active device regions, the data lines and the gate lines defining a plurality of regions including the active device regions and the pixel regions;

a gate-insulating layer disposed under the gate lines, contacting the gate lines and having the same pattern as the gate lines;

a semiconductor layer disposed between the gate-insulating layer and the low k dielectric layer, having the same pattern as the gate lines;

a plurality of sources and drains disposed between the semiconductor layer and the low k dielectric layer, wherein a channel exists between each source and its corresponding drain;

a plurality of pixel electrodes disposed on the low k dielectric layer at the pixel regions and contacting the drains;

a plurality of conducting lines connecting the data lines and the sources through the contact windows; and a passivating layer disposed on the gate lines and the conducting lines.

2. The active matrix substrate for a liquid crystal display of claim 1, wherein the low k dielectric layer includes benzocyclobutene (BCB).

3. The active matrix substrate for a liquid crystal display of claim 1, wherein the conducting lines are located between the sources and the low k dielectric layer.

4. The active matrix substrate for a liquid crystal display of claim 1, wherein the pixel electrodes extend to regions between the drains and the low k dielectric layer.

5. The active matrix substrate for a liquid crystal display of claim 4, wherein the pixel electrodes extend to regions under parts of the gate lines and over parts of data lines.

6. The active matrix substrate for a liquid crystal display of claim 1, wherein the pixel electrodes and the conducting lines include indium tin oxide (ITO).

7. A method of fabricating an active matrix substrate for a liquid crystal display, comprising:

providing a transparent substrate having a plurality of active device regions and a plurality of pixel regions;

forming a plurality of data lines on the transparent substrate, parallel to a first direction and having a plurality of protruding portions covering the active device regions;

forming a low k dielectric layer on the data lines and the transparent substrate;

forming a plurality of contact windows in the low k dielectric layer, exposing the corresponding surfaces of the protruding portions of data lines;

forming a plurality of pixel electrodes on the low k dielectric layer and a plurality of conducting lines contacting the data lines through the contact windows;

forming an n-doped layer on the pixel electrodes and the conducting lines;

forming a semiconductor layer on the n-doped layer and the low k dielectric layer;

forming an insulating layer on the semiconductor layer;

forming a metal layer on the insulating layer;

defining the n-doped layer, the semiconductor layer, the insulating layer and the metal layer, the n-doped layer becoming a plurality of sources and drains, the insulating layer becoming a gate-insulating layer, the metal layer becoming a plurality of gate lines perpendicular to a first direction; and forming a passivating layer on the gate lines and the conducting lines.

8. The method of claim 7, wherein the low k dielectric layer includes benzocyclobutene (BCB).

9. The method of claim 7, wherein the pixel electrodes extend to regions under parts of the gate lines and over parts of data lines.

10. The method of claim 7, wherein the pixel electrodes and the conducting lines include indium tin oxide (ITO).

11. The method of claim 10, wherein the n-doped layer is formed by plasma treating the surface of the ITO with $PH_3$.

12. The method of claim 7, wherein the method of forming an n-doped layer, the pixel electrodes and the conducting lines comprises:

forming a transparent conducting layer on the low k dielectric layer;

depositing a layer of n-doped material; and etching the layer of n-doped material and the transparent conducting layer.

13. The method of claim 7, wherein the passivaing layer is a silicon nitride layer.

* * * * *